(12) United States Patent
Ohtsuka et al.

(10) Patent No.: US 7,731,429 B2
(45) Date of Patent: Jun. 8, 2010

(54) OPTICAL CONNECTOR AND METHOD OF ATTACHING OPTICAL FIBER CORD TO OPTICAL CONNECTOR

(75) Inventors: Kenichiro Ohtsuka, Yokohama (JP); Daizo Nishioka, Yokohama (JP); Yukihiro Yokomachi, Yokohama (JP); Kenichi Suzuki, Yokohama (JP); Takayasu Yamauchi, Yokohama (JP); Katsuyuki Aihara, Yokohama (JP); Keisuke Okada, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 18 days.

(21) Appl. No.: 12/295,144

(22) PCT Filed: Apr. 9, 2007

(86) PCT No.: PCT/JP2007/057813

§ 371 (c)(1),
(2), (4) Date: Sep. 29, 2008

(87) PCT Pub. No.: WO2007/116992

PCT Pub. Date: Oct. 18, 2007

(65) Prior Publication Data
US 2009/0252460 A1 Oct. 8, 2009

(30) Foreign Application Priority Data
Apr. 10, 2006 (JP) .............................. 2006-108102

(51) Int. Cl.
*G02B 6/36* (2006.01)
*G02B 6/255* (2006.01)

(52) U.S. Cl. .......................................... 385/81; 385/95
(58) Field of Classification Search .................. 385/78, 385/81, 95–99
See application file for complete search history.

(56) References Cited

U.S. PATENT DOCUMENTS

| 5,909,528 A | 6/1999 | Tamekuni et al. | |
| 6,142,677 A * | 11/2000 | Sato et al. | 385/72 |
| 2009/0238523 A1 * | 9/2009 | Honma et al. | 385/96 |

FOREIGN PATENT DOCUMENTS

| JP | H04-024706 U | 2/1992 |
| JP | H09-127371 A | 5/1997 |
| JP | 09171125 A * | 6/1997 |
| JP | H09-292545 A | 11/1997 |
| JP | H11-160563 A | 6/1999 |
| JP | 2001-235656 A | 8/2001 |
| JP | 2006-030663 A | 2/2006 |

* cited by examiner

*Primary Examiner*—Daniel Petkovsek
(74) *Attorney, Agent, or Firm*—Global IP Counselors, LLP

(57) ABSTRACT

An optical connector has a simple structure and a method of attaching an optical fiber cord to the connector is easy. The connector 1 includes: a plug part 2 which has a capillary 5 provided at the front and containing a built-in optical fiber 6 and which includes a mechanical splicing portion 7 capable of allowing an optical fiber 51 to be inserted from the rear so as to be fixed therein; a caulking stand 35 capable of holding a sheath by radially contracting in a state in which the optical fiber cord 50 is inserted therein; a caulking ring 45 provided outside the cylindrical portion 36 of the stand 35 so as to hold the tension member 52 between the ring 45 and the stand 35; and a coupling body 20 provided behind the plug part 2 and accommodating the stand 35 and the ring 45.

8 Claims, 16 Drawing Sheets

OPTICAL CONNECTOR AND METHOD OF ATTACHING OPTICAL FIBER CORD TO OPTICAL CONNECTOR

FIELD OF THE INVENTION

The present invention relates to an optical connector for an optical fiber cord, and also to a method of attaching an optical fiber cord to the optical connector.

BACKGROUND OF THE INVENTION

The demand for high-speed data communications has increased in accordance with the spread of Internet, and the so-called Fiber-To-The-Home (FTTH) services in which optical fibers are installed in each home are also expanding. Thus, it is expected that an optical connector for optical connection will be used in a general home. For example, it is considered to attach an optical connector to the end of an optical fiber cord that is attached to optical communication equipment in the home and to insert the plug of the optical connector into an adapter provided in the wall for optical connection, so that the optical communication equipment in the home is connected with the FTTH network.

An optical connector known for such use is a connector suitable for field (indoor) assembly, having a structure which comprises a built-in optical fiber-containing capillary provided at the tip and a mechanical splice provided at the rear inside. Japanese Patent Application Publication No. 2001-235656 discloses an SC connector having a built-in mechanical splice that enables field assembly, as well as tools and method for assembling a field-assembly optical connector so as to be attached to an end of an optical fiber cord. In the disclosed technique, the optical connector is assembled using an optical connector assembly tool that is equipped with a connector support stand, a fiber support stand for clamping an optical fiber cord, a tension member fixing tool for fixing a tension member exposed at the end of the optical fiber cord, and a moving mechanism for moving the connector support stand back and forth relative to the fiber support stand.

In order to obtain stable optical and mechanical characteristics, the optical connector attached to the end of the optical fiber cord must endure the force that is applied from the outside to the optical fiber cord. For example, the optical connector is required not only to hold the sheath of an optical fiber cord but also to allow the tension member of the optical fiber cord to be fixed to the optical connector so that the tension member may bear the tension acting on the optical fiber cord.

It has been difficult to assemble a conventional field-assembly optical connector in a manner such that a tension member is fixed while a sheath is held, and generally the assembly work has been complex. Also, since the conventional field-assembly optical connector has an additional structure for enabling field-assembly, its structure has been complicated. For example, in the case of the optical connectors described in Japanese Patent Application Publication No. 2001-235656, it has been necessary to use an optical connector assembly tool having a tension member fixing jig so that a tension member may be fixed, and consequently the connector assembly work is also complex.

SUMMARY OF THE INVENTION

Problems to be Solved by the Invention

An object of the present invention is to provide an optical connector having a simple structure allowing ease in the work of attaching an optical fiber cord thereto and a method of attaching an optical fiber cord to the optical connector.

Means for Solving the Problem to be Solved

In order to solve the problems, an optical connector to be attached to an optical fiber cord comprising an optical fiber, a tension member arranged around the optical fiber, and a sheath comprises (1) a plug part which has a built-in optical fiber-containing capillary provided at the front and which includes a mechanical splicing portion that can allow an optical fiber to be inserted from the rear so as to be fixed therein, (2) a caulking stand into which an optical fiber cord is inserted, (3) a caulking ring which is provided outside the caulking stand so as to hold the tension member between the caulking ring and the caulking stand and which causes the caulking stand to radially contract so that the caulking stand may hold the sheath, and (4) a coupling body which is provided behind the plug part and which accommodates the caulking stand and the caulking ring. Here, the term "at the front of the optical connector" means the front side that faces a counter part to be connected therewith.

In the optical connector relating to the present invention, the caulking stand may have a slit and also may have nail-shaped protuberances at the inner circumferential surface. The caulking stand may also have a cylindrical portion and a flange portion and a caulking ring is provided around the cylindrical portion. The flange portion is provided at the rear of the cylindrical portion and may have a groove for accommodating a tension member. In addition, the caulking stand may be regulated with respect to displacement in terms of the turning direction relative to the plug part. The coupling body may be equipped with a fastening part for fastening the caulking stand in the condition in which the caulking stand is accommodated therein. These features can be adopted solely or simultaneously.

In another aspect of the present invention, a method of attaching to an optical connector an optical fiber cord having an optical fiber, a tension member arranged around the optical fiber, and a sheath is provided. The method comprises: (1) preparing the optical fiber cord which is inserted into a caulking stand and the sheath of which is removed at the end portion; (2) folding back the tension member over the outside of the caulking stand, and press-fitting the folded-back tension member to the inside of the caulking ring together with the caulking stand, and causing the caulking stand to radially contract so that the tension member may be held between the caulking stand and the caulking ring and at the same time the caulking stand may hold the sheath; (3) removing the coating of the optical fiber and cutting the optical fiber to a predetermined length; (4) inserting the optical fiber into a plug part which has a built-in fiber-containing capillary at the front and which has a mechanical splicing portion that allows an optical fiber to be inserted from the rear so as to be fixed, and fixing the optical fiber by closing the mechanical splicing portion in the state in which the built-in fiber and the optical fiber are butted against each other; and (5) housing the caulking stand in the coupling body provided behind the plug part.

In the method of attaching an optical fiber cord to an optical connector relating to the present invention, at the time of putting a tension member between the caulking stand and the caulking ring, the tension member may be accommodated in grooves formed in the caulking stand.

ADVANTAGEOUS EFFECT OF THE INVENTION

With an optical connector of the present invention and the method of attaching an optical fiber cord to the optical connector, it is possible to fix a tension member by holding the tension member between the caulking stand and the caulking ring. In that case, the caulking stand is radially contracted so that the sheath of the optical fiber cord is held. Also, the optical fiber of the optical fiber cord is inserted into and fixed in the mechanical splicing portion in the plug part, and the caulking stand and the caulking ring which have fixed the sheath and the tension member are housed in the coupling body provided behind the plug part. That is, the structure for fixing a sheath and a tension member to the optical connector is simple, and it is possible to easily perform the assembly work of the optical connector without using a jig for fixing the tension member beforehand.

DESCRIPTION OF REFERENCED NUMERALS

Figure 1:
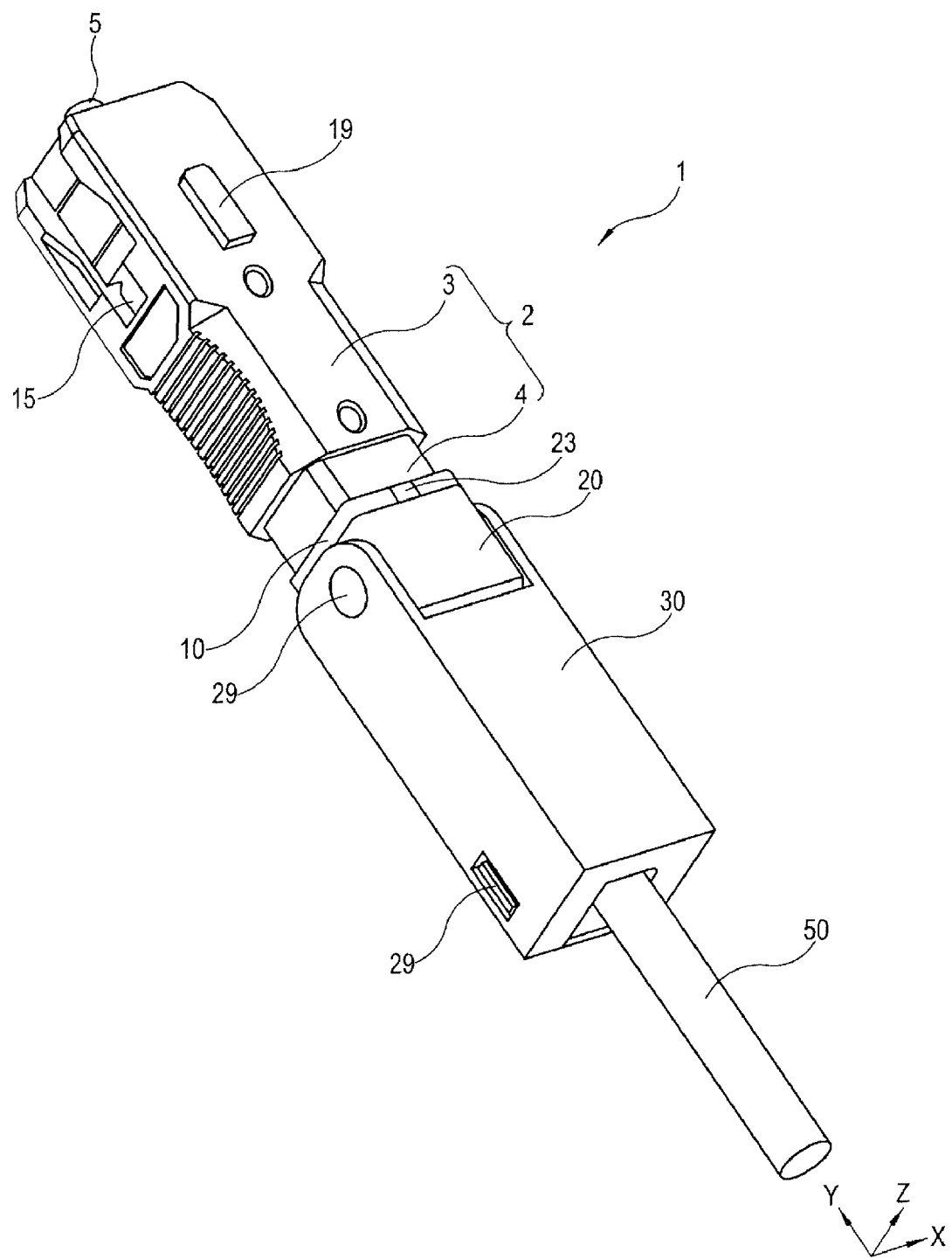
FIG. 1 is a perspective view showing the condition in which an optical fiber cord is attached to an optical connector according to an embodiment of the present invention.

1: optical connector, 2: plug part, 3: plug housing, 4: plug frame, 5: capillary, 6: built-in fiber, 7: mechanical splicing portion, 20: coupling body, 27: fastening piece (fastening part), 30: cover member, 35: caulking stand, 37: slit, 41: groove, 42: nail-shaped protuberance, 45: caulking ring, 50: optical fiber cord, 51: optical fiber, 52: tension member, 53: sheath, 60: press-fitting jig, 100: assembly tool.

DETAILED DESCRIPTION OF THE INVENTION

Hereinafter, preferred embodiments of the present invention will be described in reference to the accompanying drawings. The drawings are provided for the purpose of explaining the embodiments and not intended to limit the scope of the invention. In the drawings, an identical mark represents the same element so that the repetition of explanation may be omitted. The dimensional ratios in the drawings are not always exact.

Figure 5:
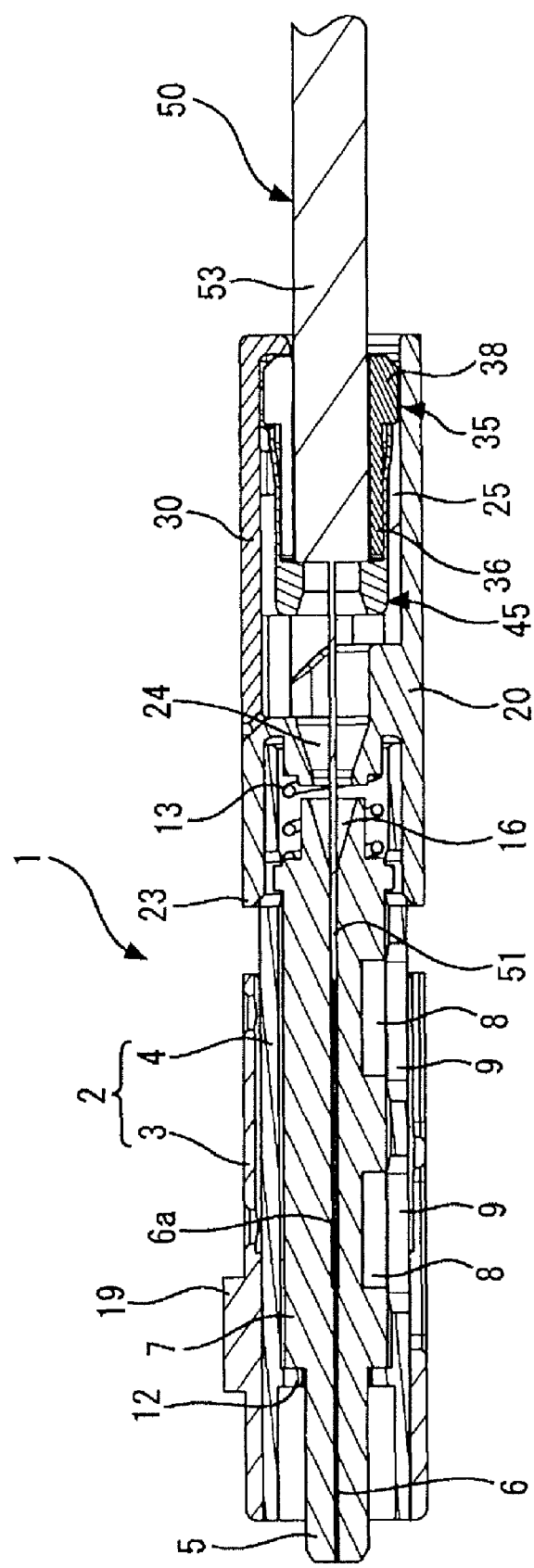
FIG. 5 is a sectional view in the YZ plane of the optical connector and the optical fiber cord of FIG. 1.
Figure 6:
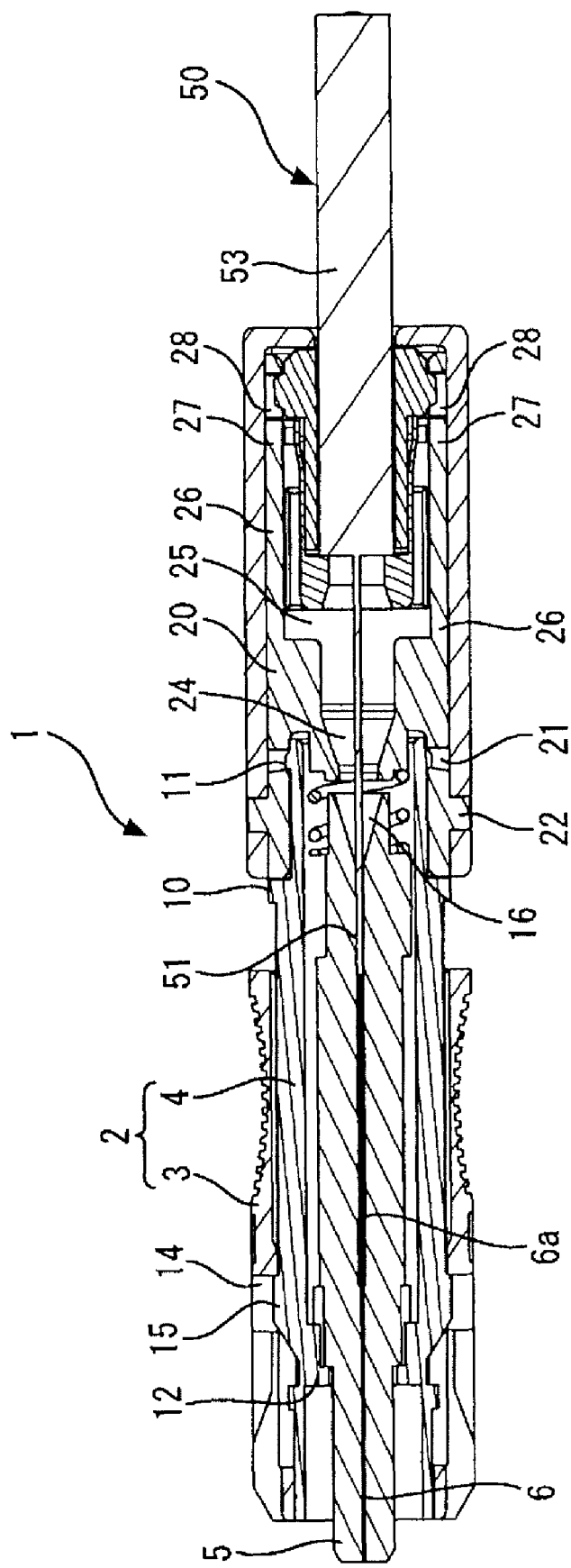
FIG. 6 is a sectional view in the XY plane of the optical connector and the optical fiber cord of FIG. 1.

FIG. 1 is a perspective view showing the condition in which an optical fiber cord is attached to an optical connector according to an embodiment of the present invention. The optical connector 1 comprises a plug part 2, which is to be inserted into an adapter or the like of its coupling counterpart, and a coupling body 20 attached to the rear of a plug frame 4 that is a constituent element of the plug part 2. The coupling body 20, which accommodates the sheathed end portion of the optical fiber cord 50 mounted in the optical connector 1, is covered with a cover member 30. The optical fiber cord 50, whose optical fiber is inserted into the inside of the plug part 2 and whose sheathed end potion is held inside the coupling body 20, is extended outward from the rear of the coupling body 20. The optical fiber cord 50 is accommodated inside the coupling body 20 and the cover member 30 in a state in which the end of the sheath 53 is held by a caulking stand 35 and a caulking ring 45 as shown in FIG. 5 and FIG. 6.

Figure 2:
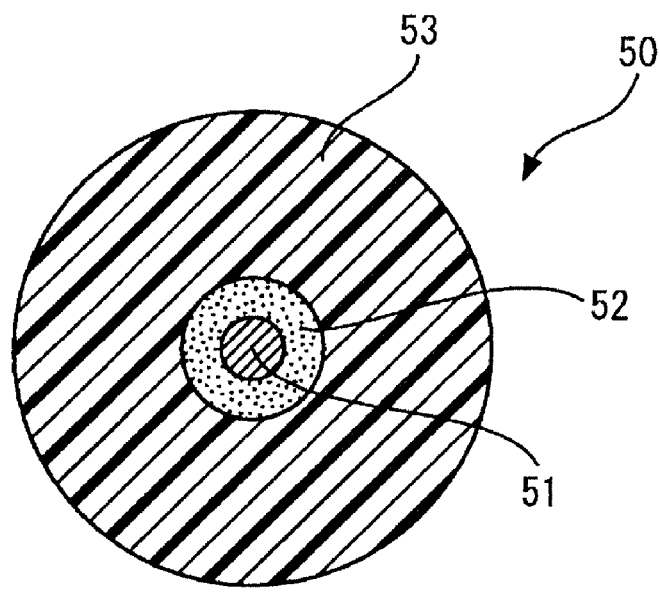
FIG. 2 is a sectional view showing an example of an optical fiber cord connected with the optical connector of the present invention.

FIG. 2 is a sectional view showing an example of an optical fiber cord connected with an optical connector of the present invention. The optical fiber cord 50 has a circular cross-section, and a tension member 52 consisting of aramid fibers or the like is provided along the longitudinal length around a coated optical fiber 51, and further a sheath 53 made of PVC or the like is provided around the tension member. An exemplary structure of the optical fiber cord is such that the outer diameter of the optical fiber 51 is 0.5 mm, the tension member 52 is made of five bundles of 1140-denier aramid fibers arranged around the optical fiber 51, and the sheath 53 formed of a PVC layer has an inner diameter of 1.2 mm and an outer diameter of 3.0 mm.

The following properties are required of the optical fiber cord, for example: the tension member does not move in a longitudinal direction relative to the optical fiber so that mechanical characteristics may be maintained; and the optical fiber cord has flexibility allowing ease in bending at the time of wiring and storage. In order to prevent the movement of the tension member, it is desirable that the tension member be arranged at high density inside the sheath (so-called tight structure); however, the control should be done to the degree that the spring back mobility of the optical fiber may not be lost. Also, in order to prevent the transmission characteristics from being degraded due to the lateral pressure, the thicker the sheath, the more preferable.

Figure 3:
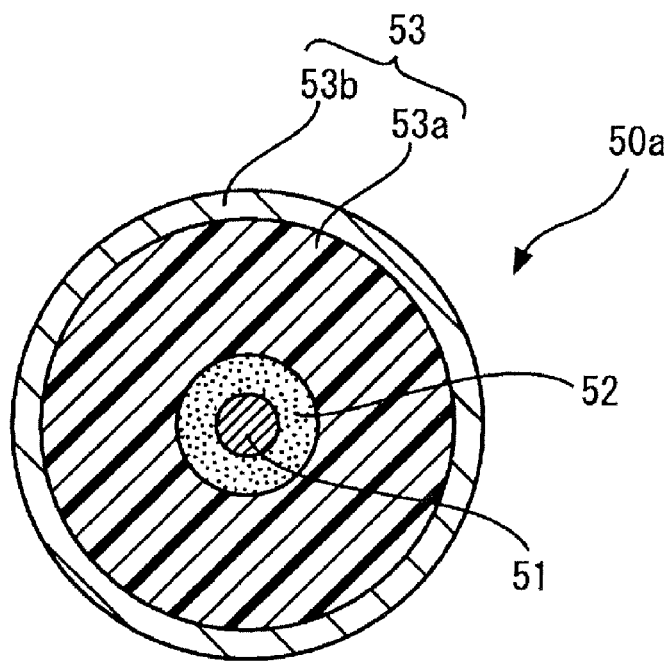
FIG. 3 is a sectional view showing another example of optical fiber cord connected with the optical connector of the present invention.

FIG. 3 is a sectional view showing another example of optical fiber cord connected with an optical connector of the present invention. In the optical fiber cord 50a, a sheath 53 has a two-layer structure. The materials for the inner layer 53a and the outer layer 53b of the sheath 53 are selected so that the desired elasticity and flame retardancy may be obtained respectively. For example, forming the outer layer 53b with PVC that is harder than the inner layer 53a allows improvement in the handling property of the cord as well as in the ease of tightening the tension member 52 through the sheath 53.

Figure 4:
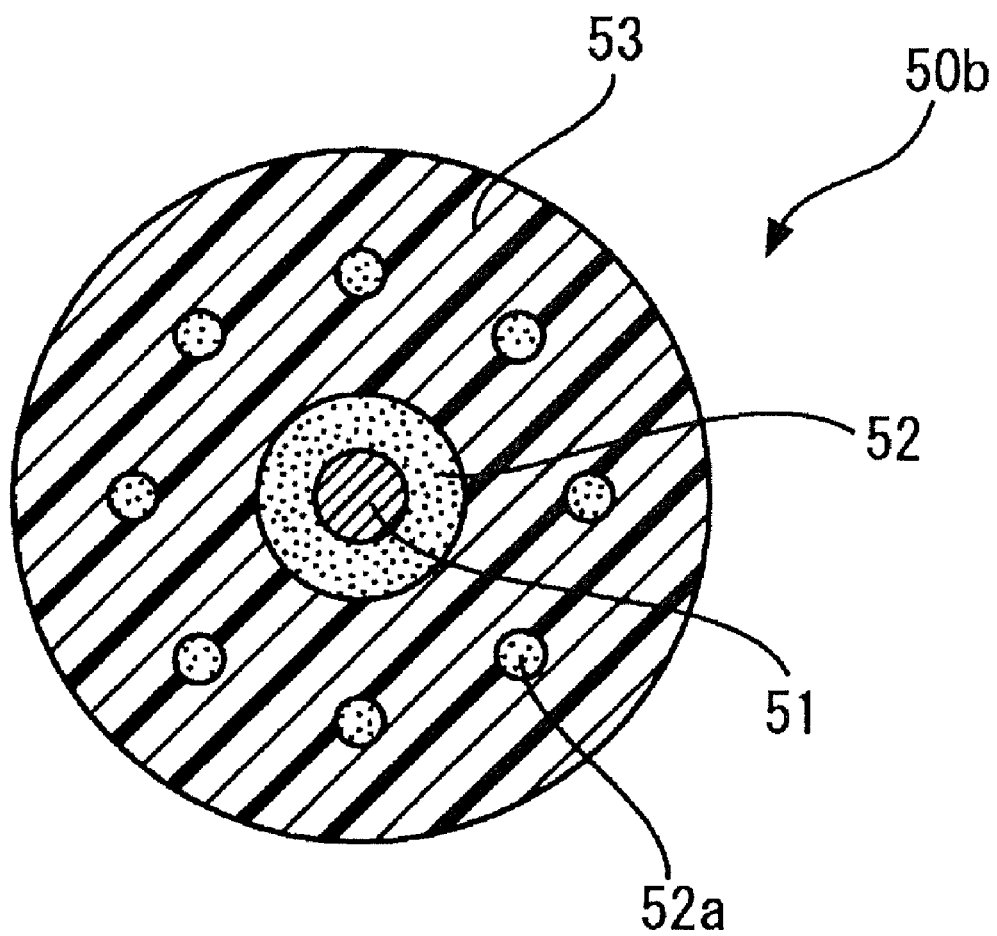
FIG. 4 is a sectional view showing a further example of optical fiber cord connected with the optical connector of the present invention.

FIG. 4 is a sectional view showing a further example of optical fiber cord connected with an optical connector of the present invention. The optical fiber cord 50b has tension members 52a arranged in the layer of sheath 53, in addition to the tension member 52 provided around the optical fiber 51. Because the tension members 52a are thus added, the optical fiber cord 50b is improved in terms of tensile strength as a cord and superior with respect to ease in handling.

Next, the description of each part of the optical connector 1 will be given. FIG. 5 is a sectional view in the YZ plane of the optical connector 1 and the optical fiber cord 50, and FIG. 6 is a sectional view of them in the XY plane. As for the plug part 2, a tubular plug housing 3 is provided around a tubular plug frame 4, and a mechanical splicing portion 7 is housed inside the plug frame 4. The mutual positioning of the plug frame 4 and the plug housing 3 is accomplished by engagement between the fastening protuberance 15 of the plug frame 4 and the fastening hole 14 of the plug housing 3. A fastening protuberance 19 is formed at a position near the front side of the plug housing 3. The fastening protuberance 19 functions for positioning in a manner such that when it is inserted into the adapter or the like of its coupling counterpart, it engages with the fastening part of the coupling counterpart and thereby causes the optical connector 1 to stop so that its position relative to the coupling counterpart is determined.

Figure 7:
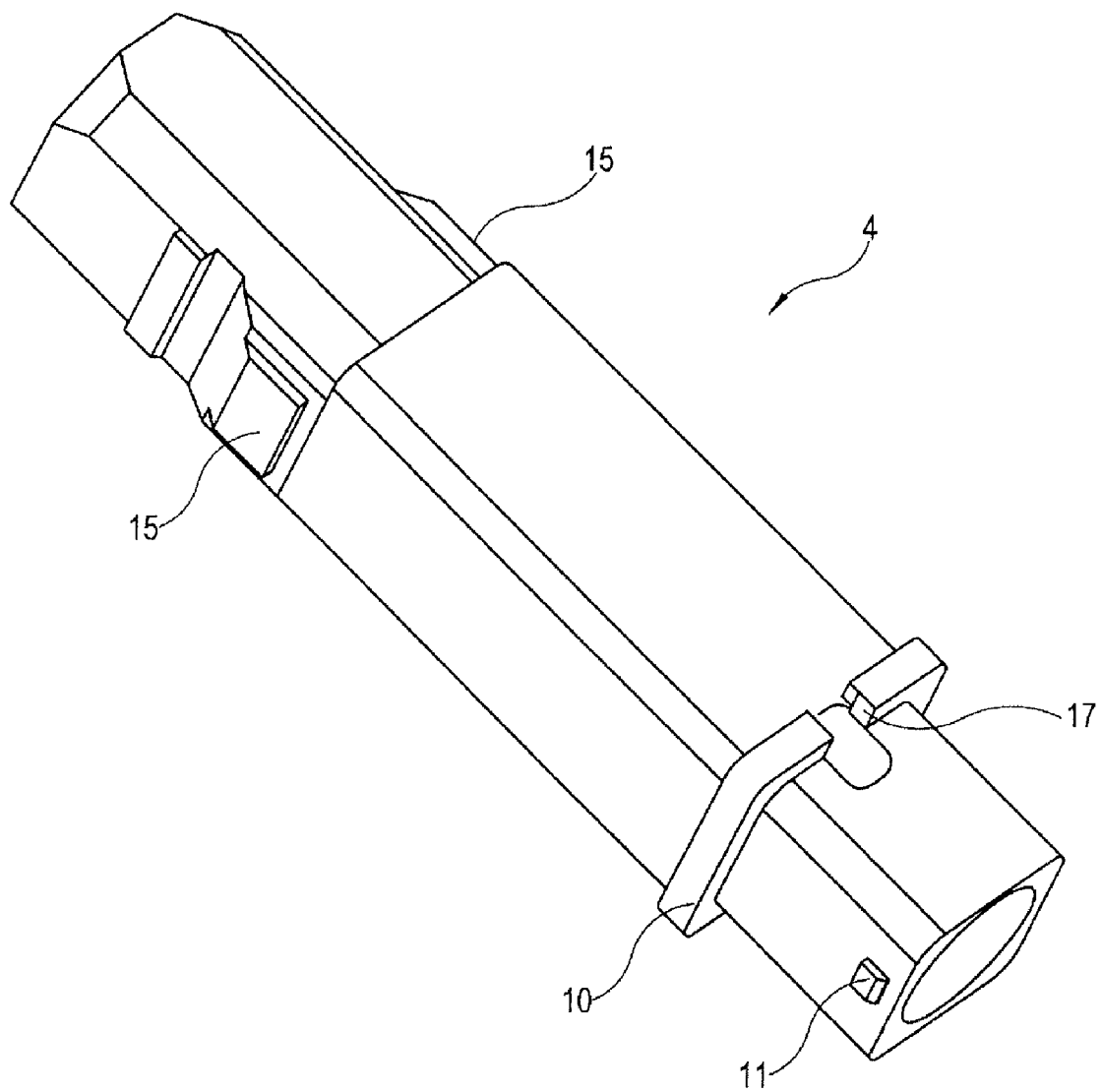
FIG. 7 is a perspective view of the plug frame of the optical connector shown in FIG. 1.

FIG. 7 is a perspective view of the plug frame 4 of the optical connector 1. The plug frame 4 functions to determine the positioning by causing the radially contracted rib 12, which is provided at an inner position near the front (refer to FIG. 5), to butt the front end side of the mechanical splicing portion 7, which is housed in the inside. When the coupling body 20, which will be described later, is attached, the rear end of a coil spring 13, which is arranged in the rear inside of the plug frame 4, butt against the coupling body 20, and consequently the mechanical splicing portion 7 is pushed toward the front by the elasticity resilient force of the coil spring 13.

Two windows 9 which are the openings provided corresponding to two wedge notches 8 on one side of the plug frame 4 (see FIG. 5) so that a wedge may be inserted into the two wedge notches 8 of the mechanical splicing portion 7 when the opening/closing operation of the mechanical splicing portion 7 is performed. Also, a brim 10 and a fastening protuberance 11 are formed on the rear outside of the plug frame 4 so that the coupling body 20 may be positioned and attached. A notch 17 is formed at a circumferential part of the brim 10 so that a protuberance 23 of the coupling body 20 may be engaged therein, which will be described later.

A capillary 5 including a built-in fiber 6 is attached to the front end of the mechanical splicing portion 7 (see FIG. 5) (In FIGS. 5 and 6, the capillary 5 and the mechanical splicing portion 7 are shown schematically in an integral form). The capillary 5 protrudes from the tip of the plug frame 4. The built-in fiber 6 is fixed with an adhesive in a state in which it is inserted and positioned in the optical fiber holding hole of the capillary 5, and the rear end portion of the built-in fiber 6 protrudes by a given length from the capillary 5. The rear end face of the built-in fiber 6 is connected, at a position behind the capillary 5, with the front end face of an optical fiber which is inserted into the mechanical splicing portion 7 from the rear.

A fiber introducing hole 16, whose diameter is gradually decreased to guide the optical fiber toward an optical fiber holding hole when the optical fiber is inserted from the rear, is provided at the rear end of the mechanical splicing portion 7. Also, the mechanical splicing portion 7 is equipped with a clamp member (illustrated in an integral form in the figure) which functions to generate holding force to hold the inserted optical fiber.

When the optical connector 1 is connected with the coupling counterpart, the mechanical splicing portion 7 receives rearward force at a time of butting between the capillary 5 provided in the tip portion thereof and the coupling counterpart. In such case, the mechanical splicing portion 7 is afforded with forward pressing force by the elasticity resilient force of the coil spring 13, and accordingly a force is generated so as to mutually push the connecting faces between the coupling counterpart and the built-in fiber 6 of the capillary 5 such that the connection condition is maintained.

Figure 8:
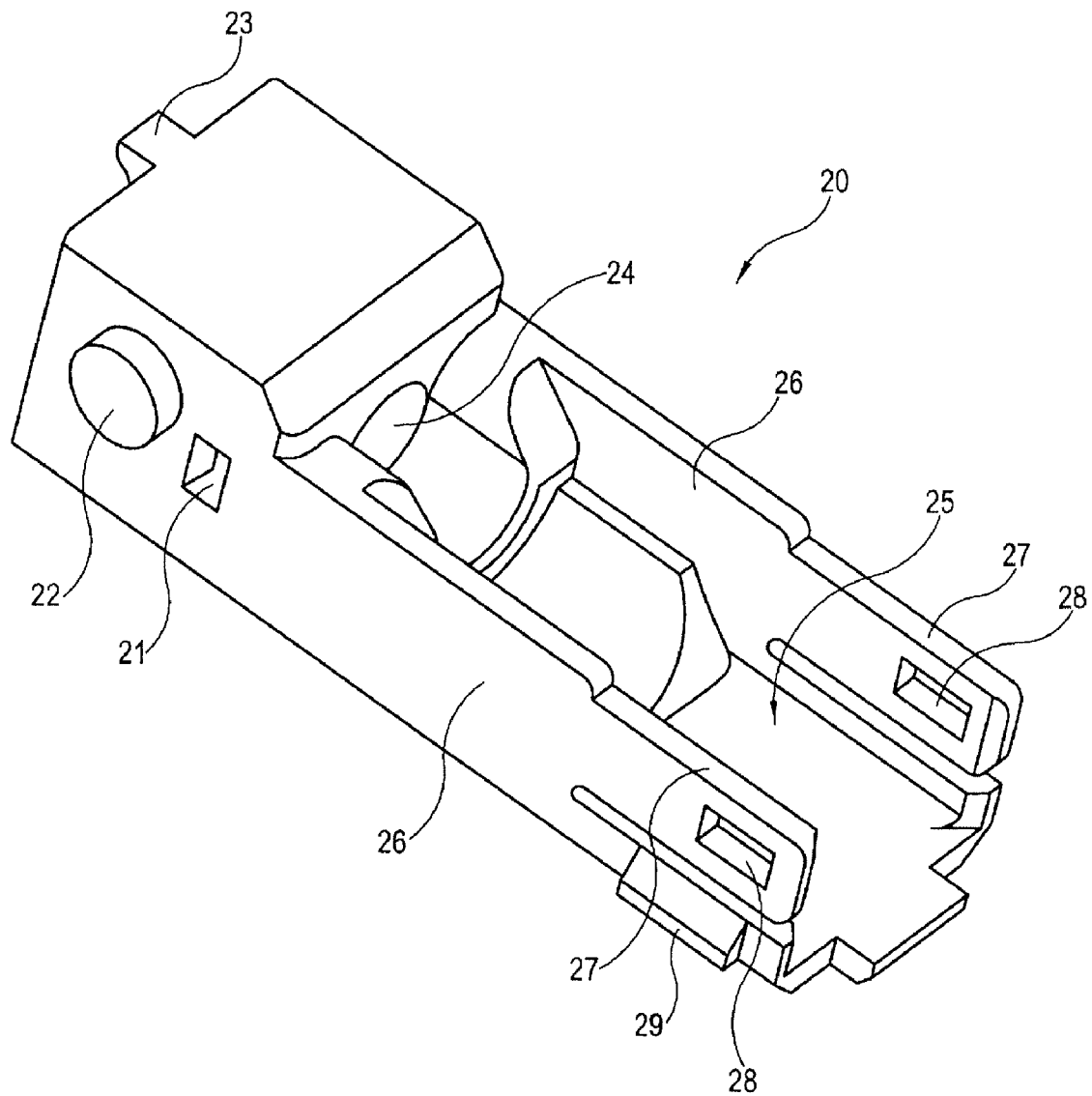
FIG. 8 is a perspective view of the coupling body of the optical connector shown in FIG. 1.

FIG. 8 is a perspective view of the coupling body 20 of the optical connector 1. The coupling body 20 has a pipe-like shape at its front portion to be attached to the plug frame 4. A protuberance 23 to be engaged in the notch 17 of the plug frame 4 is formed at the front end, and fastening holes 21, to which the fastening protuberances 11 of the plug frame 4 are fastened, and circular protuberances 22, to which a cover member 30 is attached in such a manner as to allow opening and closing, are provided in the side faces near the front of the coupling body 20.

One of the side-faces of the coupling body 20 is open at the portion on the rear end side, and a caulking portion accommodating-space 25 is provided there so as to accommodate a caulking stand 35 and a caulking ring 45 which are attached to the optical fiber cord 50. Also, a fiber introducing hole 24 whose diameter is gradually reduced toward the front is provided in the front portion beyond the caulking portion accommodating-space 25. The front end of the fiber introducing hole 24 reaches a position near the rear end of the mechanical splicing portion 7 and has a diameter smaller than the opening diameter of a fiber introducing hole 16 of the mechanical splicing portion 7. Therefore, the tip of the optical fiber 51 inserted from the coupling body 20 can be guided to be inserted into the mechanical splicing portion 7 without suffering from bumping.

Also, the coupling body 20 has fastening pieces (fastening parts) 27 respectively extending toward the rear from the side walls 26 of the caulking portion accommodating-space 25, and fastening holes 28 are formed in the fastening pieces 27. When the caulking stand 35 is being accommodated, the fastening pieces 27 interfere with the caulking stand 35 and accordingly are elastically deformed toward the outside, and when a fastening protuberance 40 (see FIG. 10) of the caulking stand 35 is fastened in a fastening hole 28, the fastening pieces 27 elastically return to their original positions again so as to fix the caulking stand 35. Also, a fastening nail 29 is provided in a protruding manner near the vicinity of each fastening piece 27 so that it can enter a fastening hole 33 of the cover member 30 (see FIG. 9) so as to hold the cover member 30 in the closed position when the cover member 30 is closed.

Figure 9:
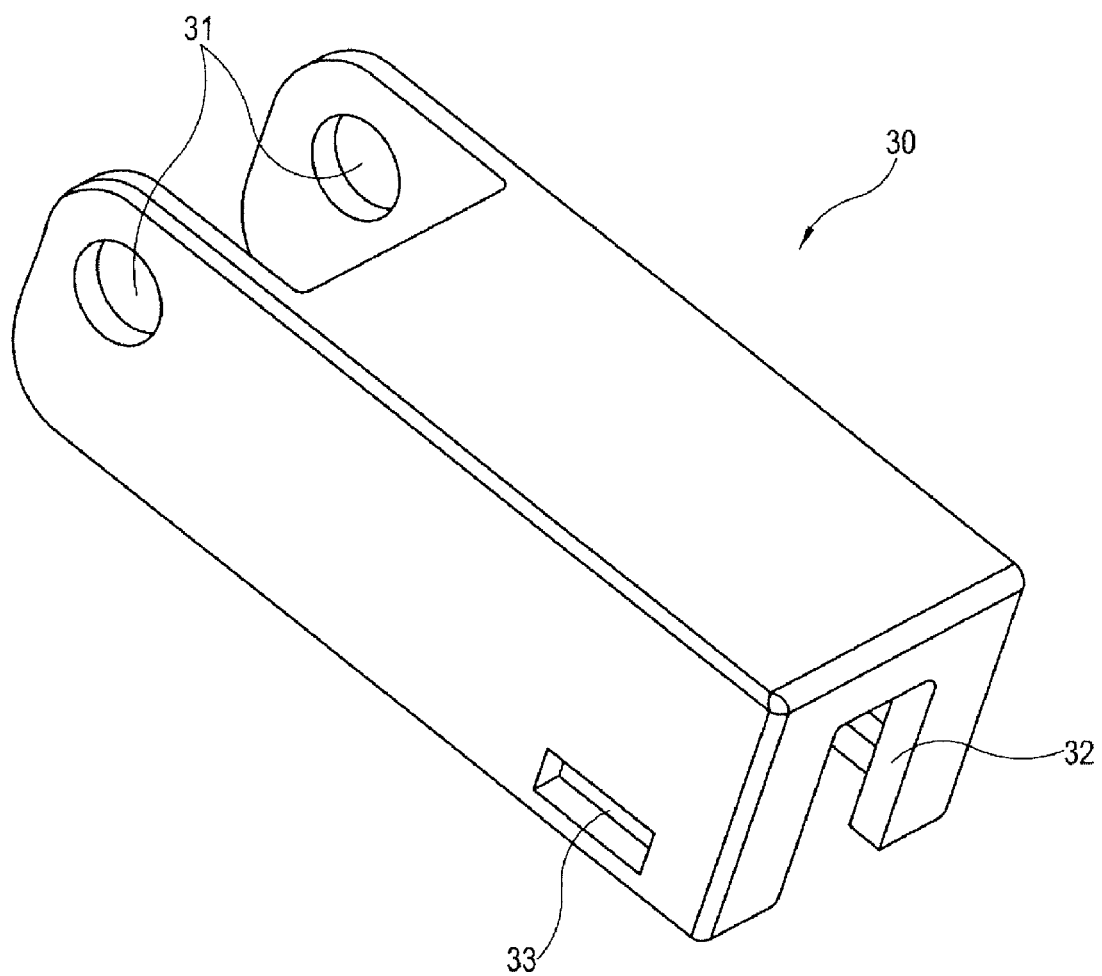
FIG. 9 is a perspective view of the cover member of the optical connector shown in FIG. 1.

FIG. 9 is a perspective view of the cover member 30 of the optical connector 1. The cover member 30 for covering the caulking portion accommodating-space 25 is structured so as to form substantially a rectangular parallelepiped shape together with the coupling body 20 when it is attached to the coupling body 20 and closed. Also, once circle holes 31 provided in the front side-faces are engaged with the circular protuberances 22 of the coupling body 20, the cover member 30 is attached to the coupling body 20 in such a manner as to allow its opening/closing relative to the coupling body 20 with the circular protuberances 22 functioning as an axis. Also, an opening portion 32 is formed in the rear end face of the cover member 30 so as not to cause interference with the optical fiber cord 50 when the cover member 30 is closed.

Figure 10:
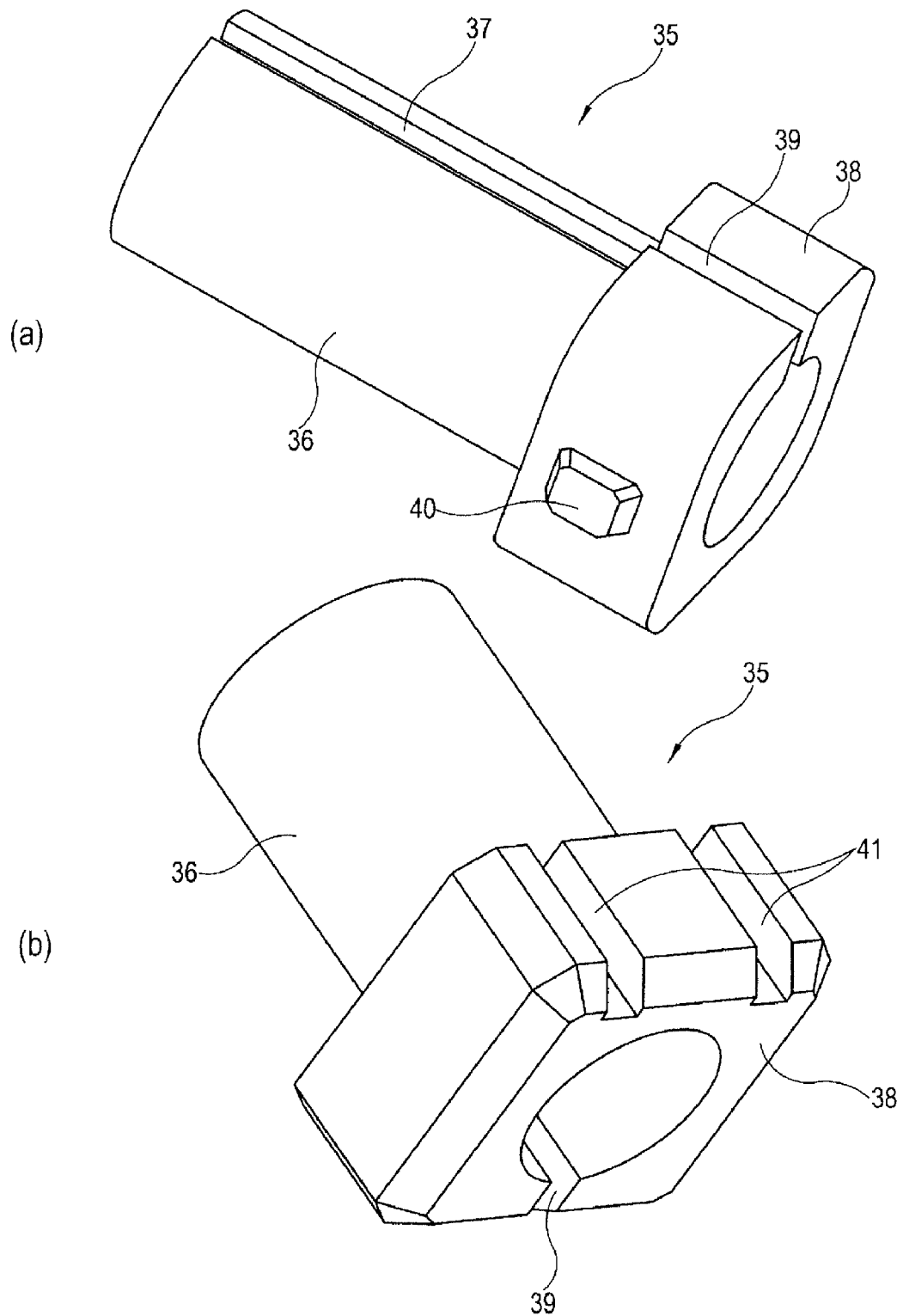
In FIG. 10, (a) is a perspective view taken from a direction of the caulking stand of the optical connector shown in FIG. 1, and (b) is a perspective view taken from another direction of the caulking stand of the optical connector shown in FIG. 1.

In FIG. 10, (a) is a perspective view taken from one direction of the caulking stand 35 of the optical connector 1, and (b) is a perspective view taken from another direction of the caulking stand 35 of the optical connector 1. The caulking stand 35 has a cylindrical portion 36 on the front side and a flange portion 38 on the rear side, and also has a hollow space continuous in each of them. The diameter of this space is a little larger than the outer diameter of the optical fiber cord 50 so that the optical fiber cord 50 can easily be inserted. The caulking stand 35 is made of a hard plastic capable of elastic deformation such as ABS and has slits 37 and 39 which are formed continuously along the axial direction. When compression force is applied from the outside in the radial direction, the caliber of the caulking stand 35 can be decreased so that it can hold the optical fiber cord 50 inserted therein.

Also, the caulking stand 35 has a fastening protuberance 40 provided on the side face of the flange portion 38 thereof, so that when the caulking stand 35 is housed in the pre-determined position of the caulking portion accommodating-space 25, the fastening protuberance 40 is fastened in the fastening hole 28 of the coupling body 20 and holds the caulking stand 35 in the caulking portion accommodating-space 25. The fastening protuberance 40 has a substantially square shape so that a displacement in the turning direction of the caulking stand 35 (that is, a displacement relative to the turning direction of the plug part 2) is effectively regulated when it is fastened in the fastening hole 28 having a like square shape. The flange portion 38 has two grooves 41 formed in one side face thereof so that the tension member 52 may be placed in bundles therein in the axial direction.

Figure 11:
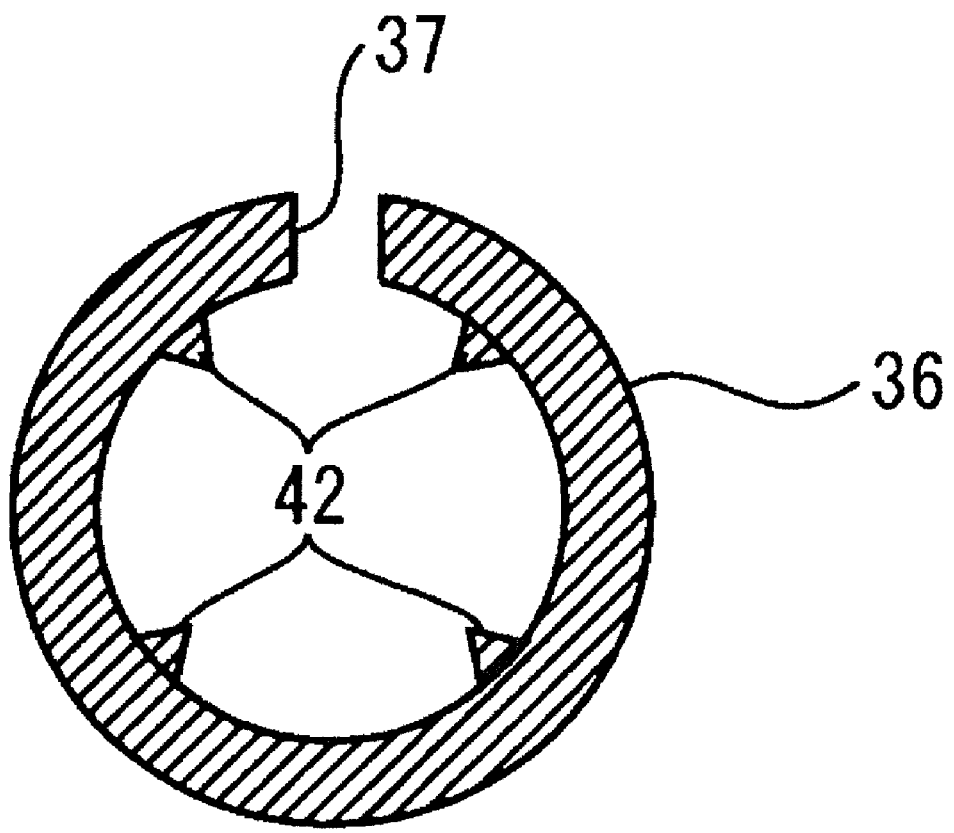
FIG. 11 is a sectional view of the caulking stand of the optical connector shown in FIG. 1.

FIG. 11 is a sectional view of the caulking stand 35 of the optical connector 1. The caulking stand 35 has a plurality (four in the present embodiment) of nail-shaped protuberances 42 arranged in a circumferential direction on the internal surface thereof so that they may function to prevent the slipping off when the sheath 53 of the optical fiber cord 50 is held by the caulking stand 35.

Figure 12:
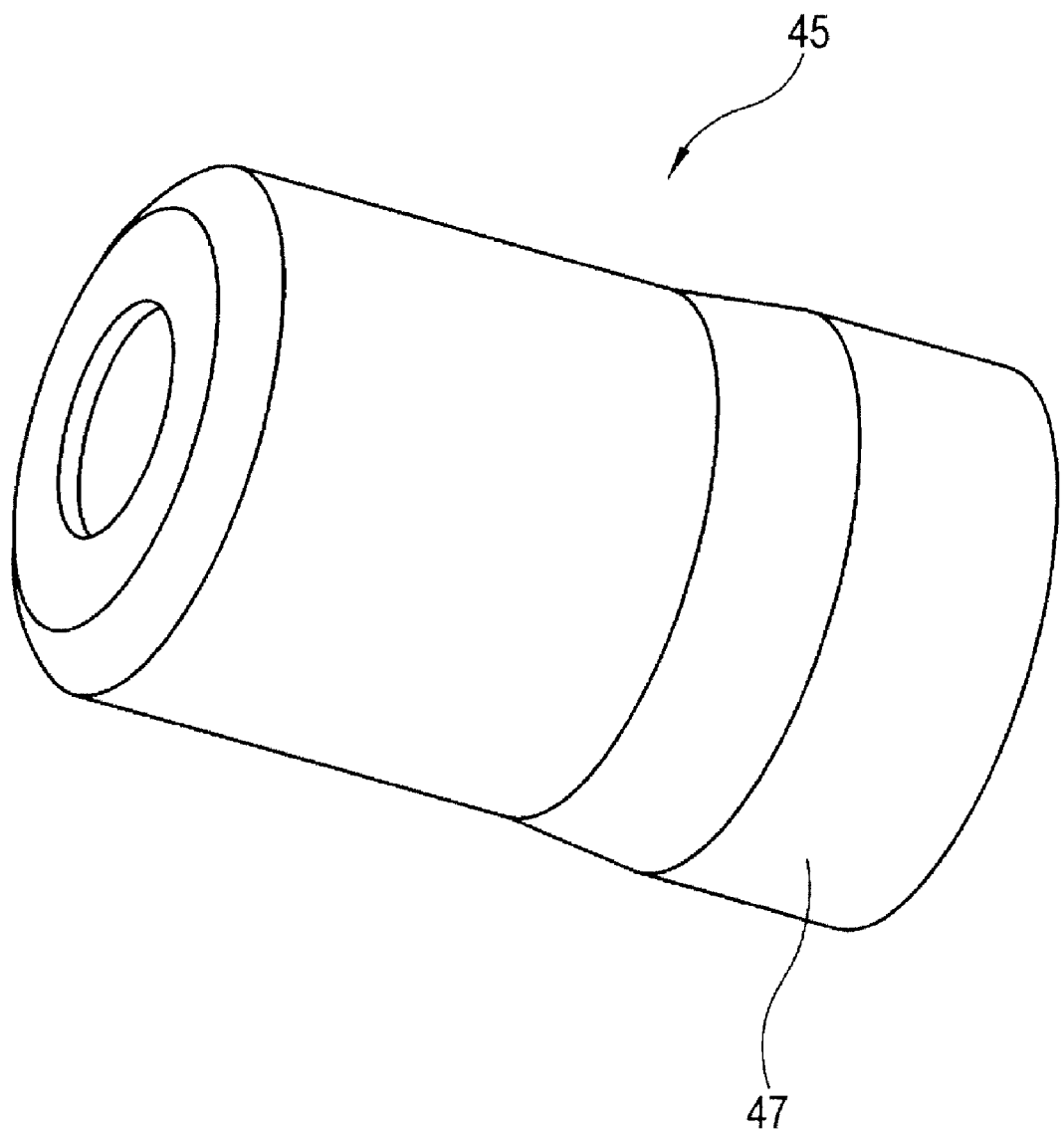
FIG. 12 is a perspective view of the caulking ring of the optical connector shown in FIG. 1.

FIG. 12 is a perspective view of the caulking ring 45 in the optical connector 1. The caulking ring 45 to be provided on the outside of the cylindrical portion 36 of the caulking stand 35 has a substantially cylindrical form of thin wall thickness and the caliber thereof is a little smaller than the outer diameter of the cylindrical portion 36. The rear portion of the caulking ring 45 is an enlarged diameter portion 47 whose diameter is increased a little toward the rear end so as to facilitate attachment to the cylindrical portion 36. The caulking ring 45 is made of a material that is at least harder than the caulking stand 35. For example, it may be made of metal such as aluminum or brass. This prevents the caulking ring 45 from suffering from the plastic deformation which might otherwise be caused by its continuous function of being attached so as to apply compression force to the caulking stand 35. Also, it enables maintaining the holding power of the caulking stand 35 with respect to the optical fiber cord 50 over a long-range of time.

The caulking ring 45 can be press-inserted over the cylindrical portion 36 of the caulking stand 35 from a front position so that the tension member 52 of the optical fiber cord 50 may be held between the caulking ring 45 and the cylindrical portion 36. The portion of the tension member 52 that extends beyond the rear of the caulking ring 45 can be stored in grooves 41 provided on the flange portion 38 of the caulking stand 35.

Next, an explanation will be given about the method of attaching an optical fiber cord 50 to the optical connector 1. For attaching the optical fiber cord 50 to the optical connector 1, first, the optical fiber cord 50 is inserted into the inside of the caulking stand 35 from the behind, and the sheath 53 is removed by a predetermined length from the end portion of the optical fiber cord 50 so as to expose the optical fiber 51 and the tension member 52. In such case, the length at which the optical fiber 51 is exposed is a distance that is longer than the distance between the front end of the caulking stand 35 and the position where the optical fiber 51 is connected with the built-in fiber 6 in the mechanical splicing portion 7 as shown in FIGS. 5 and 6. In this case, the removal of the sheath 53 may be done before the optical fiber cord 50 is inserted into the caulking stand 35.

Subsequently, the positions of the end of the sheath 53 and the front end of the caulking stand 35 are adjusted beforehand, and then the tension member 52 exposed at the front of the caulking stand 35 is folded back over the outside of the caulking stand 35 so as to be disposed in bundles in the grooves 41 of the flange portion 38. In this condition, the caulking ring 45 is attached outside the cylindrical portion 36 from the front of the caulking stand 35, and the caulking stand 35 is, together with the tension member 52 thus folded back, pushed into the caulking ring 45. At that time, the caulking stand 35 is radially contracted due to the compression force provided by the caulking ring 45, and consequently the sheath 53 of the optical fiber cord 50 is firmly held. Also, the folded-back tension member 52 is firmly held between the caulking stand 35 and the caulking ring 45. In this case, the tighter the tension member 52 of the optical fiber cord 50 is housed in the sheath 53, the more easily can the terminal treatment, such as the attachment of the caulking ring 45, for the optical fiber cord 50 be done, because the optical fiber 51 and the tension member 52 do not move in a longitudinal direction.

Figure 13:
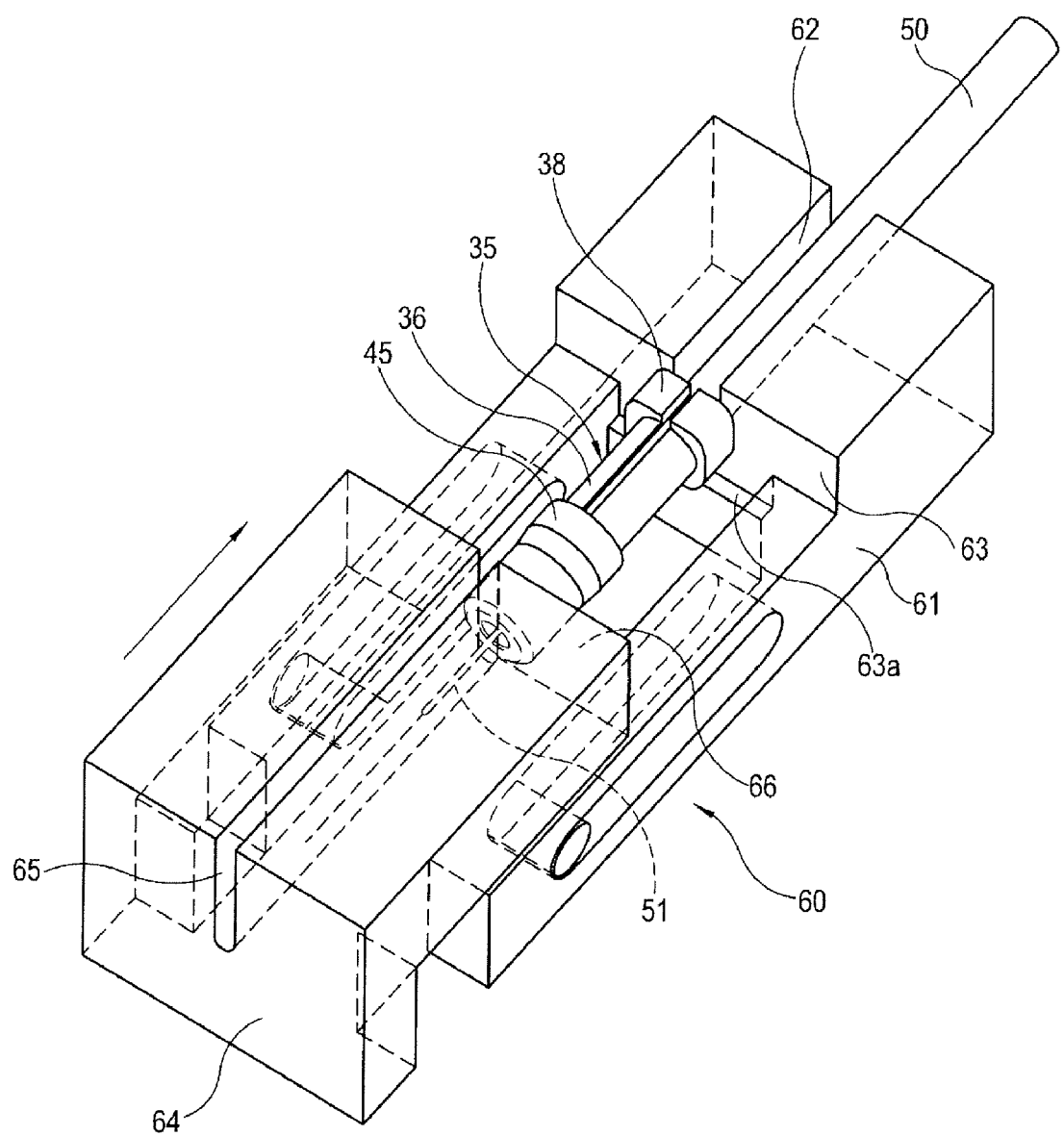
FIG. 13 is a perspective view showing an example of press-fitting jig that can be used in the method of attaching an optical fiber cord to the optical connector of the present invention.

FIG. 13 is a perspective view showing an example of press-fitting jig that can be used in the method of attaching an optical fiber cord to the optical connector of the present invention. The press-fitting jig 60, which comprises a base member 61 and a slide member 64, can press-fit the cylindrical portion 36 of the caulking stand 35 into the caulking ring 45 by causing the slide member 64 to slide toward the base member 61. An accommodating groove 62 for accommodating an optical fiber cord 50 is provided in the rear portion of the base member 61. The optical fiber cord 50 is placed in this groove from the above, and the positioning thereof is achieved by butting the rear end of the caulking stand 35 against the wall 63 existing at the front end of the accommodating groove 62. Also, the flange portion 38 of the caulking stand 35 is supported on the step portion 63a, and thereby the vertical positioning of the caulking stand 35 is achieved.

The slide member 64, which is structured to move back and forth on the base member 61, has a groove 65 formed to evade the interference with the optical fiber 51 exposed at the front of the caulking stand 35. The rear end face 66 of the slide member 64 (see FIG. 13) is caused to butt against the caulking ring 45, which is provisionally attached to the front end of the cylindrical portion 36 of the caulking stand 35, and to slide toward the rear of the base member 61. Thus, it is possible to easily and surely press-fit the caulking stand 35 into the caulking ring 45. In this case, the caulking ring 45 may be attached manually without using the jig or the like.

Figure 14:
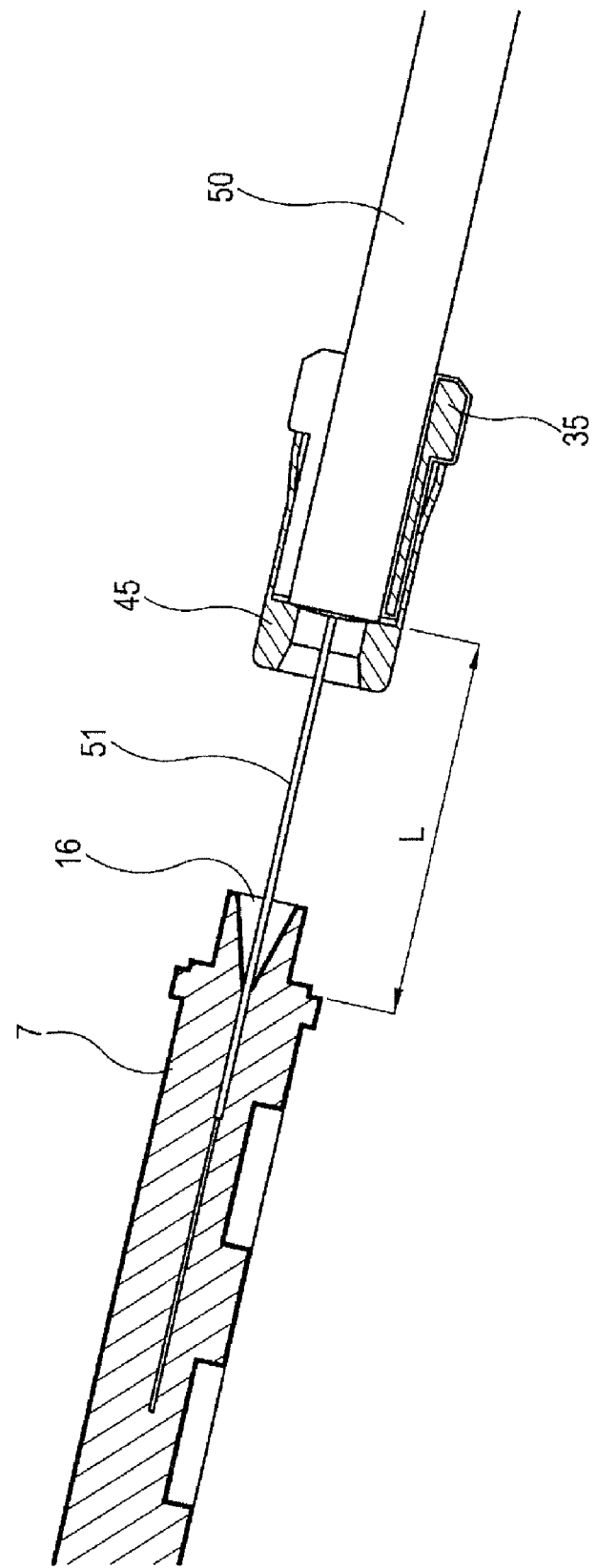
FIG. 14 is a conceptional schematic diagram showing a state of the mechanical splicing portion and an optical fiber cord under the condition in which the optical fiber of the optical fiber cord is inserted into the mechanical splicing portion so as to face the rear end face of the built-in fiber in the method of attaching an optical fiber cord to the optical connector of the present invention.

Next, the coating of the tip portion of the optical fiber 51 is removed and cut by a predetermined length. FIG. 14 is a conceptional schematic diagram showing a state of the mechanical splicing portion 7 and an optical fiber cord 50 under the condition in which the optical fiber 51 is inserted into the mechanical splicing portion and butts against the rear end face 6a of the built-in fiber. The length between the front end of the fiber introducing hole 16 and the front end of the sheath 53 is a length L of the region where the optical fiber 51 can bend. The length of the exposed portion of the optical fiber 51 should be a value that is a little greater than the length L.

After the optical fiber 51 is cut to a predetermined length, the optical fiber 51 is inserted from the fiber introducing hole 24 of the coupling body 20 into the mechanical splicing portion 7 of the plug part 2. In such case, the mechanical splicing portion 7 is made open beforehand by inserting a wedge into a wedge notch 8 of the mechanical splicing portion 7. The diameter of the fiber-introducing hole 24 gradually decreases toward the front end such that the front end diameter becomes smaller than the opening diameter of the fiber introducing hole 16 of the mechanical splicing portion 7. Therefore, the tip of optical fiber 51 can be guided to be inserted into the mechanical splicing portion 7 without bumping. Prior to such operation, the plug part 2 is assembled beforehand by putting the mechanical splicing portion 7 into the plug frame 4 and attaching the plug housing 3, and moreover the coupling body 20 is attached to the rear of the plug frame 4 beforehand. In this case, the cover member 30 may be attached to the coupling body 20 and made open beforehand.

Figure 15:
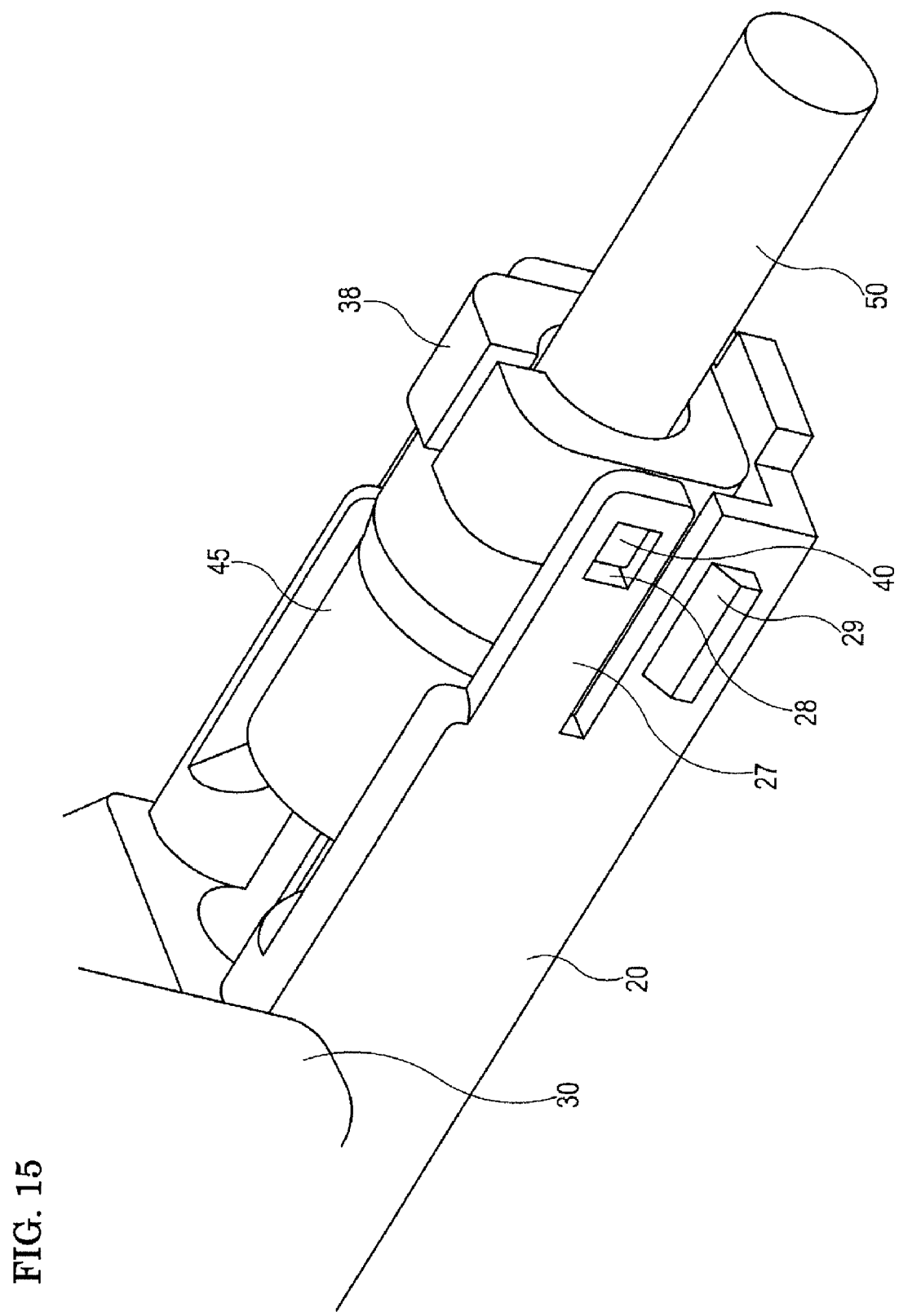
FIG. 15 is a perspective view showing a state in which the caulking stand is housed in a caulking portion accommodating-space in the method of attaching an optical fiber cord to the optical connector of the present invention.

FIG. 15 is a perspective view showing a state in which the caulking stand 35 is put in the caulking portion accommodating-space 25 in the method of attaching an optical fiber cord to the optical connector of the present invention. Once the optical fiber 51 is inserted into the mechanical splicing portion 7 and the tip thereof is butted against the rear end face 6a of the built-in fiber 6, the caulking stand 35 is housed in the caulking portion accommodating-space 25 of the coupling body 20 and the fastening protuberance 40, which is provided on the flange portion 38 of the caulking stand 35, is fastened in the fastening hole 28 of the coupling body 20. Thus, the caulking stand 35 is held in the caulking portion accommodating-space 25. The fastening protuberance 40 and the fastening hole 28 have substantially square shapes, and therefore the displacement in the turning direction of the caulking stand 35 relative to the plug part 2 is regulated so as to prevent the optical fiber 51 from being twisted after the optical fiber 51 is fixed in the mechanical splicing portion 7.

Once the caulking stand 35 is held in the caulking portion accommodating-space 25, the wedge is pulled out from the wedge notch 8 of the mechanical splicing portion 7, and then the mechanical splicing portion 7 is closed. Thus, the optical fiber 51 is fixed in the mechanical splicing portion 7 in the state where it is connected with the built-in fiber 6. In such case, the caulking stand 35 is held in the caulking portion accommodating-space 25 by the fastening of the fastening protuberance 40 and the fastening hole 28. Therefore, it is possible to pull out the wedge from the wedge notch 8 of the mechanical splicing portion 7 while maintaining the condition of the connection between the optical fiber 51 and the built-in fiber 6. Consequently, the reliability of the optical connector 1 can be secured.

Figure 16:
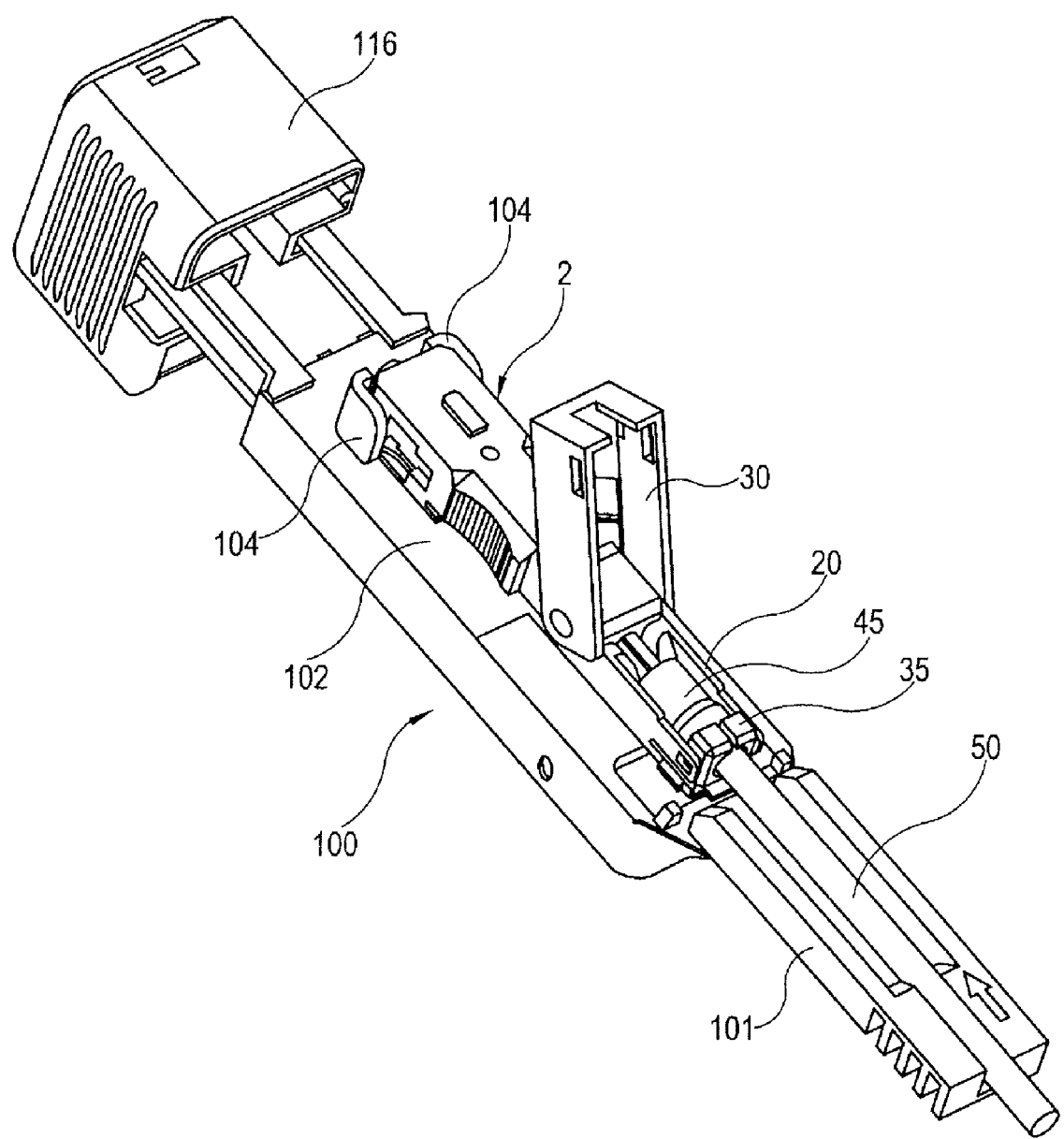
FIG. 16 is a perspective view showing the on-off operation of a wedge in the method using an assembly tool for attaching an optical fiber cord to the optical connector of the present invention.
Figure 17:
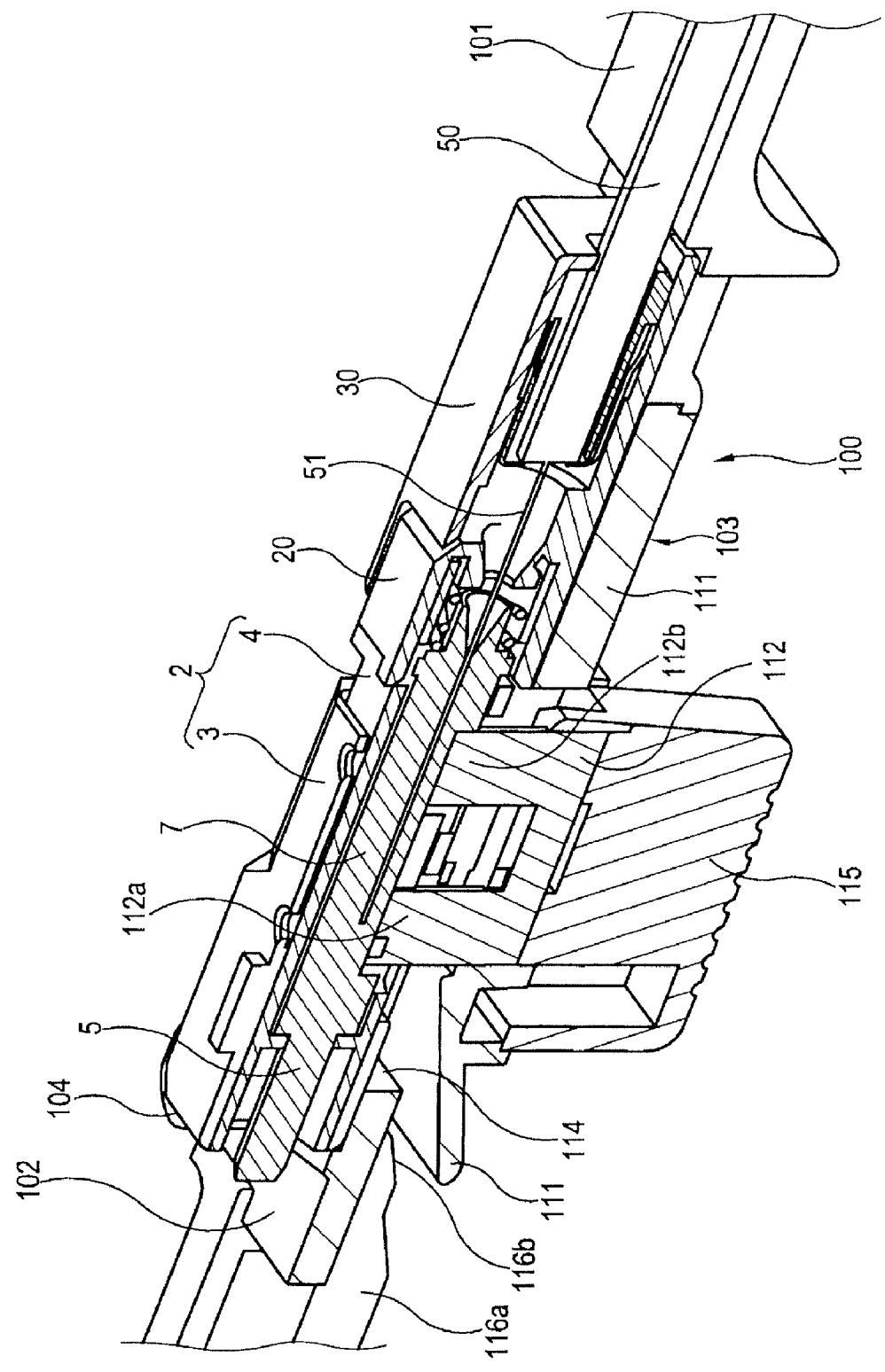
FIG. 17 is a perspective view showing the on-off operation of the wedge in the method using an assembly tool for attaching an optical fiber cord to the optical connector of the present invention.

FIGS. 16 and 17 are perspective views showing the on-off operation of the wedge in the method using an assembly tool for attaching an optical fiber cord to the optical connector of the present invention. The on-off operation of the wedge with respect to the mechanical splicing portion 7 may be performed using an assembly tool 100, although it may be done manually without using such a jig or the like. The assembly tool 100 has a cord holder 101 and a connector holder 102, and the connector holder 102 has a bending part 103 on the rear face side.

The bending part 103 is equipped with a hinge plate 111 that is engaged in the connector holder 102 on the rear end side so as to be turnably connected. A metallic or plastic wedge 112, which has a U-shaped form by a side view, is attached to the hinge plate 111. One pair of wedge prominences 112a and 112b of the wedge 112 are protruded from a window 114 formed in the connector holder 102. The wedge 112 is held by a stopper 115 which is fixed to the hinge plate 111.

The optical connector 1 is held in the connector holder 102 by holding walls 104. The connector holder 102 has a head part 116 provided at the tip thereof in a manner such that the head part is movable in the longitudinal direction. The head part 116 has a nail part 116a, and by moving the head part 116 toward the connector holder 102, the slope portion 116b at the tip of the nail part 116a enters between the connector holder 102 and the hinge plate 111. Thus, the hinge plate 111 is separated from the connector holder 102. The cord holder 101 is structured so as to hold the optical fiber cord 50 behind the connector holder 102.

Once the optical connector 1 is set in an assembly tool 100, such as the above-described one, and the built-in fiber 6 and the optical fiber 51 are butted together, the head part 116 is moved toward the connector holder 102. In this way, the slope portion 116b enters between the connector holder 102 and the hinge plate 111, whereby the hinge plate 111 is separated from the connector holder 102, thereby causing the bending part 103 to bend relative to the connector holder 102 at the connection part. Thus, the wedge prominences 112a and 112b are pulled out of the wedge notch 8 of the mechanical splicing portion 7, allowing the mechanical splicing portion 7 to be closed to hold the optical fiber 51 in a sandwiching manner so that a stable connection condition is secured.

As described above, according to the optical connector 1 of the present invention and the method of attaching the optical fiber cord to the optical connector according to the present invention, the tension member 52 can be fixed by sandwiching it between the caulking stand 35 and the caulking ring 45. In that case, the caulking stand 35 is radially contracted to hold the sheath 53 of the optical fiber cord 50. Also, the optical fiber 51 of the optical fiber cord 50 is inserted into and fixed in the mechanical splicing portion 7 of the plug part 2, and the caulking ring 45 and the caulking stand 35 in which the sheath 53 and the tension member 52 are fixed are housed in the coupling body 20 which is attached to the rear of the plug part 2. That is, the structure to fix the sheath 53 and the tension member 52 on the optical connector 1 is simple, and also the assembly work of the optical connector 1 can easily be accomplished without using a jig or the like for fixing the tension member 52 beforehand.

In the case of the caulking stand 35 of the optical connector 1 according to the above-described embodiment, the cylindrical portion 36 on the front side and the flange portion 38 on the rear side are both made of hard plastic. However, the cylindrical portion 36 may be constituted of metal such as brass. In that case, the cylindrical portion 36 does not easily suffer from elastic deformation, and accordingly the power of sandwiching to hold the tension member 52 with the caulking ring 45 is enhanced. Furthermore, the cylindrical portion 36 does not easily suffer from plastic deformation, and therefore the power to sandwich to hold the tension member 52 can be maintained for a long period of time.

The present patent application is based on a Japanese patent application (Tokugan 2006-108102) filed on Apr. 10, 2006, and the contents thereof are incorporated herein as the reference.

INDUSTRIAL APPLICABILITY

The optical connector of the present invention can be attached to the terminal of an optical fiber cord which is provided for domestic optical communication equipment, and it is suitable as an optical connector to be assembled in field (indoor assembly).

The invention claimed is:

1. An optical connector used for attachment of an optical fiber cord comprising an optical fiber, a tension member arranged around the optical fiber, and a sheath, wherein the optical connector comprises:
    a plug part having a built-in optical fiber-containing capillary provided at the front, the plug part including a mechanical splicing portion capable of allowing an optical fiber to be inserted from the rear so as to be fixed therein;
    a caulking stand that allows the optical fiber cord to be inserted;
    a caulking ring provided outside the caulking stand so as to hold the tension member between the caulking ring and the caulking stand, the caulking ring being capable of radially contracting the caulking stand so as to hold the sheath; and
    a coupling body provided behind the plug part, the coupling body accommodating the caulking stand and the caulking ring.

2. An optical connector according to claim 1, wherein the caulking stand has a slit.

3. An optical connector according to claim 2, wherein the caulking stand has nail-shaped protuberances at the inner circumferential surface.

4. An optical connector according to claim 3, wherein the coupling body is equipped with a fastening part for fastening the caulking stand accommodated therein.

5. An optical connector according to claim 2, wherein the caulking stand is regulated with respect to the displacement in terms of the turning direction relative to the plug part.

6. An optical connector according to claim 2, wherein the caulking stand has a cylindrical portion and a flange portion, the caulking ring being inserted over the cylindrical portion, the flange portion being provided at the rear of the cylindrical portion and having grooves for accommodating the tension member.

7. An optical connector according to claim 2, wherein the coupling body is equipped with a fastening part for fastening the caulking stand accommodated therein.

8. An optical connector according to claim 1, wherein the coupling body is equipped with a fastening part for fastening the caulking stand accommodated therein.

* * * * *